United States Patent
He et al.

(10) Patent No.: US 9,099,943 B2
(45) Date of Patent: Aug. 4, 2015

(54) ELECTROMAGNETIC VIBRATION EXCITER SYSTEM WITH ADJUSTABLE ELECTRO-VISCOELASTIC SUSPENSION DEVICE

(75) Inventors: Wen He, Hangzhou (CN); Chunyu Wang, Hangzhou (CN); Runjie Shen, Hangzhou (CN); Shushi Jia, Hangzhou (CN); Mei Yu, Beijing (CN); Mingde Ma, Beijing (CN)

(73) Assignees: ZHEIJIANG UNIVERSITY, Hangzhou, Zhejiang Province (CN); NATIONAL INSTITUTE OF METROLOGY P.R. CHINA, Beijing (CN)

( * ) Notice: Subject to any disclaimer, the term of this patent is extended or adjusted under 35 U.S.C. 154(b) by 162 days.

(21) Appl. No.: 13/821,945
(22) PCT Filed: May 3, 2012
(86) PCT No.: PCT/CN2012/075025
§ 371 (c)(1), (2), (4) Date: May 24, 2013
(87) PCT Pub. No.: WO2012/149899
PCT Pub. Date: Nov. 8, 2012

(65) Prior Publication Data
US 2013/0234628 A1    Sep. 12, 2013

(30) Foreign Application Priority Data
May 4, 2011   (CN) .......................... 2011 1 0113959

(51) Int. Cl.
*G01M 7/02* (2006.01)
*H02P 6/16* (2006.01)
*H02P 6/00* (2006.01)

(52) U.S. Cl.
CPC ............... *H02P 6/001* (2013.01); *G01M 7/022* (2013.01); *H02P 6/16* (2013.01)

(58) Field of Classification Search
CPC ...... G01M 7/022; H02P 25/027; H02P 6/001; H02P 6/16

USPC ...................................................... 73/663, 664
See application file for complete search history.

(56) References Cited

U.S. PATENT DOCUMENTS

| | | | | | |
|---|---|---|---|---|---|
| 4,002,270 | A | * | 1/1977 | Reiner | .......................... 222/58 |
| 5,377,525 | A | * | 1/1995 | Hutchinson et al. | ................. 73/9 |
| 5,734,236 | A | * | 3/1998 | Motegi | .......................... 318/114 |
| 2006/0243643 | A1 | * | 11/2006 | Scott et al. | ..................... 209/309 |
| 2007/0030618 | A1 | * | 2/2007 | Heinz et al. | .................... 361/160 |
| 2010/0284554 | A1 | | 11/2010 | Aston et al. | |

FOREIGN PATENT DOCUMENTS

| | | |
|---|---|---|
| CN | 2618237 Y | 5/2004 |
| CN | 101576752 A | 11/2009 |
| GB | 2458533 A | 9/2009 |

* cited by examiner

*Primary Examiner* — Laura Martin
*Assistant Examiner* — Rose M Miller
(74) *Attorney, Agent, or Firm* — Jacobson Holman PLLC; Jiwen Chen

(57) ABSTRACT

The electromagnetic vibration exciter system with an adjustable electro-viscoelastic suspension device comprises an electromagnetic vibration exciter, a power amplifier and an adjustable electro-viscoelastic suspension device, which acts as the suspension device of the electromagnetic vibration exciter. The adjustable electro-viscoelastic suspension device contains a displacement sensor detecting the displacement of the moving component, a first adjustable amplifier and a second adjustable amplifier, a differentiator, an adjustable phase shifter, an adder and a proportioner. The linearity of the stiffness and damping of the exciter system is excellent, which can be adjusted as need through the adjustment of gain of the adjustable amplifier, the proportioner, the adjustable phase shifter. This invention has adjustable and linear parameters and it is also easy to be realized.

2 Claims, 2 Drawing Sheets

ELECTROMAGNETIC VIBRATION EXCITER SYSTEM WITH ADJUSTABLE ELECTRO-VISCOELASTIC SUSPENSION DEVICE

This is a U.S. national stage application of PCT Application No. PCT/CN2012/075025 under 35 U.S.C. 371, filed May 3, 2012 in Chinese, claiming the priority benefit of Chinese Application No. 201110113959.2, filed May 4, 2011, which is hereby incorporated by reference.

FIELD OF THE INVENTION

This present invention relates to an electromagnetic vibration exciter system with an adjustable electro-viscoelastic suspension device.

BACKGROUND OF THE INVENTION

The electromagnetic vibration exciter usually comprises a fixed base, a magnetic circuit, a moving component, a guiding device, a suspension system and so on. With the development of the science and technology, the electromagnetic exciters are constantly required to output a vibration signal with a larger and larger displacement amplitude. For example, at a low frequency or even an ultralow frequency, the exciter should output a vibration signal with the displacement amplitude of 1000 mm in order to obtain a large signal-to-noise ratio. The long-stroke vibration exciter raises new requirement for the property of the elastic suspension device.

An electromagnetic vibration exciter generally uses mechanical elastic suspension devices, such as metal spring leaf or rubber tubes, etc. to support and restore the moving component. When the operating stroke of the exciter is relatively small, the mechanical elastic suspension device operates in a linear zone, whose effect on the accuracy of the output waveform of the exciter is negligible. When the operating stroke of the exciter is relatively large (for example, when working at an ultralow frequency up to 0.01 Hz, the exciter could output a vibration signal with the displacement amplitude of up to 1000 mm), the mechanical elastic suspension device will exhibit relatively large nonlinear characteristics, which will have a relatively large impact on the exciter performance. Besides, the larger the displacement amplitude of the exciter is, the smaller the stiffness of the mechanical elastic suspension device should be. However, in order to reduce the effect of the zero drift of the moving component and the environmental noise, the dampness of the suspension device should be relatively large. It is difficult to design such type of mechanical elastic suspension device with small stiffness and large dampness. In addition, due to that the material characteristics of the mechanical elastic suspension device change always with time, the positional accuracy cannot be repeatable. Finally, when the installation of the mechanical elastic suspension device is finished, its stiffness and damping parameters cannot be modified freely any more. For these reasons, the mechanical elastic suspension device cannot meet the requirement arisen with the continuous development of electromagnetic exciters, especially for the long-stroke electromagnetic exciter.

SUMMARY OF THE INVENTION

To overcome the above shortcomings of the prior art, the present invention provides a novel electromagnetic vibration exciter system with an adjustable electro-viscoelastic suspension device. Such suspension device has the function of a traditional mechanical device but with the stiffness and damping parameters that can be adjusted easily according to actual requirements. The present invention has an excellent linear quality even for a long-stroke vibration, which results in significant improvement of the performance of the novel electromagnetic exciter.

The electromagnetic vibration exciter system with an adjustable electro-viscoelastic suspension device comprises an electromagnetic exciter and a power amplifier;

Its characteristics are as follow. The adjustable electro-viscoelastic suspension device is adopted in the vibration exciter system to support and restore its moving component and comprises a displacement sensor detecting the displacement of the moving component of the electromagnetic exciter, a first adjustable amplifier, a second adjustable amplifier, a differentiator, an adder and an adjustable phase shifter, a subtracter, a proportioner.

The displacement signal detected by the sensor is processed by the first adjustable amplifier and a first amplified signal is produced. The displacement signal is simultaneously processed by the differentiator and the second adjustable amplifier successively and a second amplified signal is produced. The first amplified signal and the second amplified signal are added by the adder, the output of which is processed by the adjustable phase shifter. The phase-shifted signal is imported into the subtracter as subtrahend. Another input terminal of the subtracter is connected with the signal generator, the standard output of which is the minuend. The subtracter output is imported into the proportioner, the output of which is amplified by the power amplifier and then is imported into the exciter as the driving signals.

In addition, the transfer function of the proposed exciter system is as follow:

$$G(s) = \frac{X(s)}{U(s)} \tag{1}$$

$$= K_3 K_p \cdot \frac{Bl}{mLs^3 + (mR + c_2L)s^2 + [Rc_2 + (Bl)^2 + K_2K_3K_4K_pBl]s + K_1K_3K_4K_pBl}$$

$$= \frac{K_3 K_p Bl}{R} \cdot \frac{1}{\frac{mL}{R}s^3 + \left(m + \frac{c_2L}{R}\right)s^2 + \left[c_2 + \frac{(Bl)^2 + K_2K_3K_4K_pBl}{R}\right]s + \frac{K_1K_3K_4K_pBl}{R}}$$

where m is the total mass of the moving component (including the vibration table and the load under excitation); $c_2$ is the damping caused by other factors than the suspension device, such as air damping; B is the magnetic flux density in the air gap; l is the length of the coil within the magnetic field; L and R are the inductance and resistance of the coil respectively; $K_1$, $K_2$, $K_3$, $K_4$ and $K_P$ is the gain of the first adjustable amplifier, the second adjustable amplifier, the proportioner, the adjustable phase shifter and the power amplifier, respectively; $s=j\omega$ is the Laplace operator; $\omega$ is the circular frequency of the vibration.

$$C = c_2 + \frac{(Bl)^2 + K_2K_3K_4K_pBl}{R}$$

in (1) reflects the equivalent damping characteristic of the system;

$$K = \frac{K_1 K_3 K_4 K_P Bl}{R}$$

reflects its equivalent stiffness characteristic; $c_2$ is mainly caused by air damping;

$$\frac{K_2 K_3 K_4 K_P Bl}{R} \gg c_2$$

can be true if $K_2$, $K_3$, $K_4$ are adjusted properly and $$C \approx \frac{(Bl)^2 + K_2 K_3 K_4 K_P Bl}{R};$$

B is assumed as constant independent with the displacement of the moving component x; Then the damping factor C and the stiffness factor K both keep as constant and could be adjusted easily as need through the adjustment of $K_1$, $K_2$, $K_3$, $K_4$.

In addition, the transfer function of the exciter system running at the low and ultralow frequency is as follow:

$$G(s) = \frac{X(s)}{U(s)} \quad (2)$$

$$= K_3 K_P \cdot \frac{Bl}{mRs^2 + [Rc_2 + K_2 K_3 K_4 K_P Bl + (Bl)^2]s + K_1 K_3 K_4 K_P Bl}$$

$$= \frac{K_3 K_P \cdot Bl}{R} \cdot \frac{1}{ms^2 + \left[c_2 + \frac{K_2 K_3 K_4 K_P Bl + (Bl)^2}{R}\right]s + \frac{K_1 K_3 K_4 K_P Bl}{R}}$$

where $$C = c_2 + \frac{(Bl)^2 + K_2 K_3 K_4 K_P Bl}{R}$$

in (2) reflects the equivalent damping characteristic of the system;

$$K = \frac{K_1 K_3 K_4 K_P Bl}{R}$$

reflects its equivalent stiffness characteristic; $c_2$ is mainly caused by air damping;

$$\frac{K_2 K_3 K_4 K_P Bl}{R} \gg c_2$$

can be true if $K_2$, $K_3$, $K_4$ are adjusted properly and $$C \approx \frac{(Bl)^2 + K_2 K_3 K_4 K_P Bl}{R};$$

B is assumed as constant independent with the displacement of the moving component x; Then the damping factor C and the stiffness factor K both keep as constant. The system thus has good linear characteristics. Through the adjustment of the gain of the adjustable amplifier, the adjustable phase shifter and the proportioner, the equivalent stiffness factor K and damping factor C of the suspension system of the exciter can be directly adjusted.

The technical consideration of present invention is to replace the uncontrollable, nonlinear mechanical suspension device with the controllable, linear and precise electrical device. The displacement signal of the exciter is processed by the proportioner and the differentiator and then is fed back into the exciter system to realize the function of former mechanical suspension device.

The electromagnetic vibration exciter usually comprises a fixed base, a magnetic circuit, a moving component, a guiding device, and a suspension system and so on. The traditional mechanical elastic suspension device based on metal spring leaf or rubber belt, etc. is often applied to support and restore the moving component. The moving component is composed of a coil, a coil skeleton and a vibration table, the three of which are well connected. Its first-order modal frequency is more than five times as the maximum working frequency and it can be seen as a rigid body. Then the electromagnetic vibration exciter can be simplified as a single-degree-of-freedom model. Meanwhile take into consideration of the electrical equation of the driving coil and the equation reflecting the electromechanical coupling relation can be expressed as $$\begin{cases} m\ddot{x} + c\dot{x} + kx = Bli \\ L\frac{di}{dt} + Ri + Bl\dot{x} = u_0 \end{cases} \quad (3)$$

where m is the total mass of the moving component (including the vibration table and the load under excitation); k and c is the stiffness and damping of the moving component respectively, $c=c_1+c_2$, $c_1$ is caused by the mechanical suspension device and $c_2$ is caused by other factors, such as air damping; B is the magnetic flux density in the air gap; l is the length of the coil within the magnetic field; L and R is the inductance and resistance of the coil respectively; i is the current flowing in the coil; $u_0$ is the driving voltage applied between the two ends of the coil; x is the displacement of the vibration table.

Then the transfer function of traditional vibration exciter is expressed as $$G_2(s) = \frac{X(s)}{U_0(s)} \quad (4)$$

$$= \frac{Bl}{mLs^3 + (mR + cL)s^2 + [Rc + (Bl)^2 + kL]s + Rk}$$

Traditional vibration exciter system comprises an exciter and a power amplifier with the transfer function of $G_1(s)=K_p$. Then the transfer function of the traditional vibration exciter system is expressed as $$G_2(s) = \frac{X(s)}{U(s)} \quad (5)$$

$$= K_p \cdot \frac{Bl}{mLs^3 + (mR + cL)s^2 + [Rc + (Bl)^2 + kL]s + Rk}$$

$$= \frac{K_p Bl}{R} \cdot \frac{1}{\frac{mL}{R}s^3 + \left(m + \frac{cL}{R}\right)s^2 + \left[c + \frac{(Bl)^2 + kL}{R}\right]s + k}$$

where $K_p$ is gain of the power amplifier.

$$C = c + \frac{(Bl)^2 + kL}{R}$$

in (5) reflects the equivalent damping characteristic of the system; K=k reflects the equivalent stiffness characteristic. K and C cannot be adjusted easily after the installation and contains nonlinear factors k and c, which results in the nonlinearity of K and C.

The mechanical suspension device is removed in present invention. So k=0, c=$c_2$, and the electromechanical coupling equation is shown as $$\begin{cases} m\ddot{x} + c_2 \dot{x} = Bli \\ L\frac{di}{dt} + Ri + Bl\dot{x} = u_0 \end{cases} \quad (6)$$

where $c_2$ is mainly caused by the air damping. Then the transfer function of the exciter is $$G_2(s) = \frac{X(s)}{U_0(s)} \quad (7)$$

$$= \frac{Bl}{mLs^3 + (mR + c_2 L)s^2 + [Rc_2 + (Bl)^2]s}$$

Meanwhile, an adjustable electro-viscoelastic suspension device is adopted, which is realized as follow.

The displacement signal x detected by a displacement sensor is processed by a first adjustable amplifier with gain of $K_1$ and a first amplified signal is produced. The displacement signal x is simultaneously processed by a differentiator and a second adjustable amplifier with gain of $K_2$ successively and a second amplified signal is produced. The first amplified signal and the second amplified signal are added by an adder, the output of which is processed by an adjustable phase shifter with gain of $K_4$ and phase shift of ϕ. Then the output of the phase shifter is subtracted as subtrahend by the standard output of a signal generator, and the difference is processed by a proportioner with gain of $K_3$ and then is amplified by a power amplifier with gain of $K_P$ as follow. The output of the power amplifier is imported into the exciter as the driving signals in the end.

Then the transfer function of the feedback unit is $$G_3(s) = (K_1 + K_2 s) \cdot K_4 e^{-j\phi} \quad (8)$$

Assuming that the phase shift of the adjustable phase shifter ϕ=0, then $$G_3(s) = (K_1 + K_2 s) \cdot K_4 \quad (9)$$

The transfer function of the power amplifier and the proportioner are $G_1(s) = K_p$ and $G_4(s) = K_3$ respectively, then the transfer function of the whole exciter system with the electro-viscoelastic suspension device is $$G(s) = \frac{X(s)}{U(s)} \quad (10)$$

$$= K_3 K_p \cdot \frac{Bl}{mLs^3 + (mR + c_2 L)s^2 + [Rc_2 + (Bl)^2 + K_2 K_3 K_4 K_p Bl]s + K_1 K_3 K_4 K_p Bl}$$

$$= \frac{K_3 K_p Bl}{R} \cdot \frac{1}{\frac{mL}{R}s^3 + \left(m + \frac{c_2 L}{R}\right)s^2 + \left[c_2 + \frac{(Bl)^2 + K_2 K_3 K_4 K_p Bl}{R}\right]s + \frac{K_1 K_3 K_4 K_p Bl}{R}}$$

where $$C = c_2 + \frac{(Bl)^2 + K_2 K_3 K_4 K_p Bl}{R}$$

in (10) reflects the equivalent damping characteristic of the system;

$$K = \frac{K_1 K_3 K_4 K_p Bl}{R}$$

reflects its equivalent stiffness characteristic;

$$\frac{K_2 K_3 K_4 K_p Bl}{R} \gg c_2$$

can be true if $K_2$, $K_3$, $K_4$ are adjusted properly and $$C \approx \frac{(Bl)^2 + K_2 K_3 K_4 K_p Bl}{R}.$$

Compared with C and K in (5), the two factors here are irrelevant with nonlinear factors k and c. B is assumed as a constant independent with the displacement of the moving component x, then the damping factor C and the stiffness factor K both keep as constant and could be adjusted easily as need through the adjustment of $K_1$, $K_2$, $K_3$ and $K_4$.

Especially, $$\frac{di}{dt}$$

is negligible for the low-frequency and ultralow-frequency vibration and it can be assumed that $$\frac{di}{dt}$$

in (3) is equal to zero, then the electromechanical coupling equation of traditional electromagnetic exciter changes to be $$\begin{cases} m\ddot{x} + c\dot{x} + kx = Bli \\ Ri + Bl\dot{x} = u_0 \end{cases} \quad (11)$$

Accordingly, the transfer function of traditional exciter system is $$G(s) = \frac{X(s)}{U(s)} \quad (12)$$

$$= K_P \cdot \frac{Bl}{mRs^2 + [Rc + (Bl)^2]s + Rk}$$

$$= \frac{K_P Bl}{R} \cdot \frac{1}{ms^2 + \left(c + \frac{(Bl)^2}{R}\right)s + k}$$

Such system can be seen as a typical single-degree-of-freedom model. The equivalent damping and stiffness are $$C = c + \frac{(Bl)^2}{R}$$

and K=k respectively. K and C cannot be adjusted easily after the installation completion and contain nonlinear factors k and c, which result in the nonlinearity of K and C.

The electromechanical equation (6) of traditional electromagnetic exciter removing the mechanical suspension device changes to be $$\begin{cases} m\ddot{x} + c_2\dot{x} = Bli \\ Ri + Bl\dot{x} = u_0 \end{cases} \quad (13)$$

Then the transfer function of the exciter system applying the electro-viscoelastic suspension device changes to be $$G(s) = \frac{X(s)}{U(s)} \quad (14)$$

$$= K_3 K_P \cdot \frac{Bl}{mRs^2 + [Rc_2 + K_2 K_3 K_4 K_P Bl + (Bl)^2]s + K_1 K_3 K_4 K_P Bl}$$

$$= \frac{K_3 K_P \cdot Bl}{R} \cdot \frac{1}{ms^2 + \left[c_2 + \frac{K_2 K_3 K_4 K_P Bl + (Bl)^2}{R}\right]s + \frac{K_1 K_3 K_4 K_P Bl}{R}}$$

Such system can also be seen as a typical single-degree-of-freedom model. The equivalent damping and stiffness are $$C = c_2 + \frac{(Bl)^2 + K_2 K_3 K_4 K_P Bl}{R} \text{ and}$$

$$K = \frac{K_1 K_3 K_4 K_P Bl}{R}$$

respectively. $c_2$ is mainly caused by air damping;

$$\frac{K_2 K_3 K_4 K_P Bl}{R} >> c_2$$

can be true if $K_2$, $K_3$, $K_4$ are adjusted properly and $$C \approx \frac{(Bl)^2 + K_2 K_3 K_4 K_P Bl}{R}.$$

Assuming B is a constant independent with the displacement of the moving component x, then the equivalent damping factor C and the stiffness factor K in function (14) both keep as constant and the system has excellent linear characteristics and the performance of the system can be improved. Comparing functions (12) and (14), it can be clearly seen that, through the adjustment of the gain of the adjustable amplifier, the adjustable phase shifter and the proportioner, the equivalent damping factor C and the stiffness factor K can be directly adjusted.

To solve the phase shift between the input voltage and output displacement signal of the exciter appearing at high working frequency, the adjustable phase shifter can be adjusted to ensure that the phase of the feedback signal and the standard signal remains consistent.

The present invention has the advantage of parameter adjustable, linear and convenience.

DETAILED DESCRIPTION OF THE INVENTION

Hereinafter, embodiments of the present invention will be described with reference to the accompanying drawings.

The electromagnetic vibration exciter system with an adjustable electro-viscoelastic suspension device comprises an electromagnetic vibration exciter and a power amplifier.

The adjustable electro-viscoelastic suspension device is adopted in the vibration exciter system to support and restore its moving component and comprises a displacement sensor detecting the displacement of the moving component of the electromagnetic exciter, a first adjustable amplifier, a second adjustable amplifier, a differentiator, an adder and an adjustable phase shifter, a subtracter, a proportioner.

The displacement signal detected by the sensor is processed by the first adjustable amplifier and a first amplified signal is produced. The displacement signal is simultaneously processed by the differentiator and the second adjustable amplifier successively and a second amplified signal is produced. The first amplified signal and the second amplified signal are added by the adder, the output of which is processed by the adjustable phase shifter. The phase-shifted signal is imported into the subtracter as subtrahend. Another input terminal of the subtracter is connected with the signal generator, the standard output of which is the minuend. The subtracter output is imported into the proportioner, the output of which is amplified by the power amplifier and then is imported into the exciter as the driving signals.

The technical consideration of present invention is to replace the uncontrollable, nonlinear mechanical suspension device with the controllable, linear and precise electrical device. The displacement signal of the exciter is processed by the proportioner and the differentiator and then is fed back into the exciter system to realize the function of former mechanical suspension device.

Figure 1:
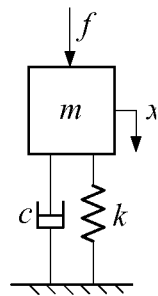
FIG. 1 is a dynamic model of the moving component in the electromagnetic vibration exciter.
Figure 2:
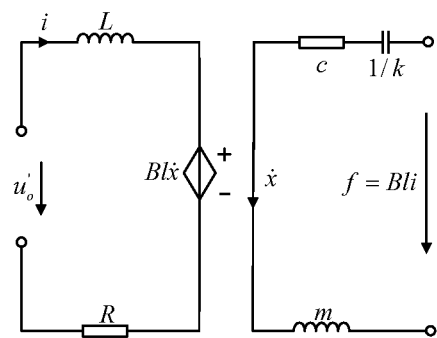
FIG. 2 is an electromechanical coupling model of the electromagnetic vibration exciter.

The electromagnetic vibration exciter usually comprises a fixed base, a magnetic circuit, a moving component, a guiding device, and a suspension system and so on. The traditional mechanical elastic suspension device based on metal spring leaf or rubber belt, etc. is often applied to support and restore the moving component. The moving component is composed of a coil, a coil skeleton and a vibration table, the three of which are well connected. Its first-order modal frequency is more than five times as the maximum working frequency and it can be seen as a rigid body. Then the electromagnetic vibration exciter can be simplified as a single-degree-of-freedom model as shown in FIG. 1. Meanwhile take into the consideration of the electrical equation of the driving coil and the equation reflecting the electromechanical coupling relation shown in FIG. 2 can be expressed as $$\begin{cases} m\ddot{x} + c\dot{x} + kx = Bli \\ L\dfrac{di}{dt} + Ri + Bl\dot{x} = u_0 \end{cases} \quad (1)$$

where m is the total mass of the moving component (including the vibration table and the load under excitation); k and c is the stiffness and damping of the moving component respectively, $c=c_1+c_2$, $c_1$ is caused by the mechanical suspension device and $c_2$ is caused by other factors, such as air damping; B is the magnetic flux density in the air gap; l is the length of the coil within the magnetic field; L and R is the inductance and resistance of the coil respectively; i is the current flowing in the coil; $u_0$ is the driving voltage applied between the two ends of the coil; x is the displacement of the vibration table.

Then the transfer function of traditional vibration exciter is expressed as $$G_2(s) = \dfrac{X(s)}{U_0(s)} \quad (2)$$
$$= \dfrac{Bl}{mLs^3 + (mR + cL)s^2 + [Rc + (Bl)^2 + kL]s + Rk}$$

Figure 3:
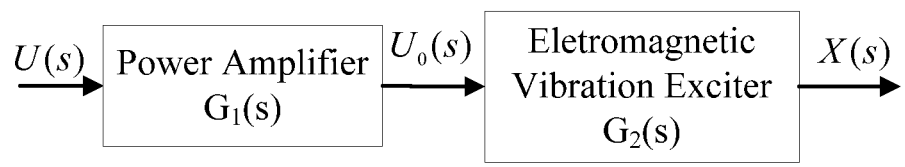
FIG. 3 is a model of the exciter system with traditional mechanical suspension device.

The model of traditional vibration exciter system is shown in FIG. 3 and the transfer function of the power amplifier is $G_1(s)=K_p$. Then the transfer function of the traditional vibration exciter system is expressed as $$G(s) = \dfrac{X(s)}{U(s)} \quad (3)$$
$$= K_p \cdot \dfrac{Bl}{mLs^3 + (mR + cL)s^2 + [Rc + (Bl)^2 + kL]s + Rk}$$
$$= \dfrac{K_p Bl}{R} \cdot \dfrac{1}{\dfrac{mL}{R}s^3 + \left(m + \dfrac{cL}{R}\right)s^2 + \left[c + \dfrac{(Bl)^2 + kL}{R}\right]s + k}$$

where $K_p$ is gain of the power amplifier.

$$C = c + \dfrac{(Bl)^2 + kL}{R}$$

in (3) reflects the equivalent damping characteristic of the system; K=k reflects the equivalent stiffness characteristic. K and C cannot be adjusted easily after the installation and contains nonlinear factors k and c, which results in the nonlinearity of K and C.

The mechanical suspension device is removed in present invention. So k=0, $c=c_2$ for (1), and the electromechanical coupling equation is shown as $$\begin{cases} m\ddot{x} + c_2\dot{x} = Bli \\ L\dfrac{di}{dt} + Ri + Bl\dot{x} = u_0 \end{cases} \quad (4)$$

where $c_2$ is mainly caused by the air damping. Then the transfer function of the exciter is $$G_2(s) = \dfrac{X(s)}{U_0(s)} = \dfrac{Bl}{mLs^3 + (mR + c_2L)s^2 + [Rc_2 + (Bl)^2]s} \quad (5)$$

Figure 4:
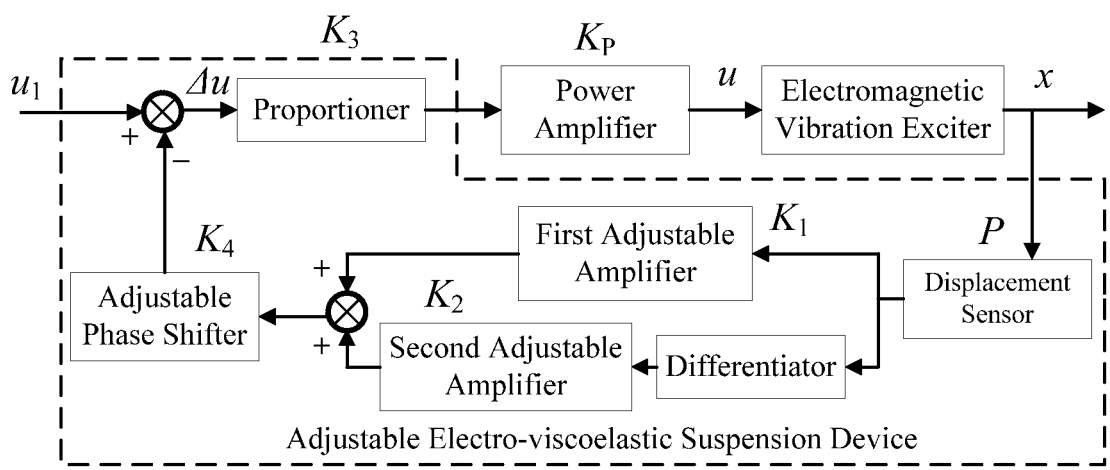
FIG. 4 is a structure of the present invention.

Meanwhile, an adjustable electro-viscoelastic suspension device with its structure shown in FIG. 4 is adopted.

The displacement x signal detected by a displacement sensor is processed by a first adjustable amplifier with gain of $K_1$ and a first amplified signal is produced. The displacement signal x is simultaneously processed by a differentiator and a second adjustable amplifier with gain of $K_2$ successively and a second amplified signal is produced. The first amplified signal and the second amplified signal are added by an adder, the output of which is processed by an adjustable phase shifter with gain of $K_4$ and phase shift of $\phi$. Then the output of the phase shifter is subtracted as subtrahend by the standard output of a signal generator, and the difference is processed by a proportioner with gain of $K_3$ and then is amplified by a power amplifier with gain of $K_P$ as follow. The output of the power amplifier is imported into the exciter as the driving signals in the end.

Figure 5:
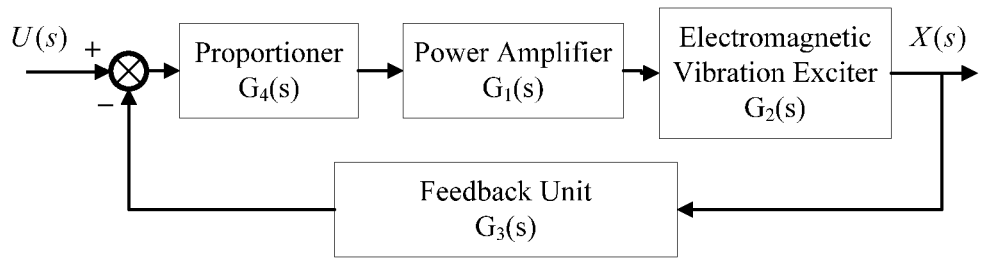
FIG. 5 is a model of the exciter system with the adjustable electro-viscoelastic suspension device.

Then the adjustable electro-viscoelastic suspension device is adopted and the model of the whole exciter system is simplified as FIG. 5. The transfer function of the feedback unit is $$G_3(s) = (K_1 + K_2 s) \cdot K_4 e^{-j\phi} \quad (6)$$

Assuming that the phase shift of the adjustable phase shift $\phi=0$, then $$G_3(s) = (K_1 + K_2 s) \cdot K_4 \quad (7)$$

The transfer function of the power amplifier and the proportioner are $G_1(s)=K_p$ and $G_4(s)=K_3$ respectively, then the transfer function of the whole exciter system with the electro-viscoelastic suspension device is $$G(s) = \dfrac{X(s)}{U(s)} \quad (8)$$

$$= K_3 K_p \cdot \frac{Bl}{mLs^3 + (mR + c_2L)s^2 + [Rc_2 + (Bl)^2 + K_2K_3K_4K_pBl]s + K_1K_3K_4K_pBl}$$

$$= \frac{K_3 K_p Bl}{R} \cdot \frac{1}{\frac{mL}{R}s^3 + \left(m + \frac{c_2L}{R}\right)s^2 + \left[c_2 + \frac{(Bl)^2 + K_2K_3K_4K_pBl}{R}\right]s + \frac{K_1K_3K_4K_pBl}{R}}$$

where $$C = c_2 + \frac{(Bl)^2 + K_2K_3K_4K_pBl}{R}$$

in (8) reflects the equivalent damping characteristic of the system;

$$K = \frac{K_1 K_3 K_4 K_p Bl}{R}$$

reflects its equivalent stiffness characteristic;

$$\frac{K_2 K_3 K_4 K_p Bl}{R} \gg c_2$$

can be true if $K_2$, $K_3$, $K_4$ are adjusted properly and $$C \approx \frac{(Bl)^2 + K_2K_3K_4K_pBl}{R}.$$

Compared with C and K in (3), the two factors here are irrelevant with nonlinear factors k and c. B is assumed as a constant independent with the displacement of the moving component x; then the damping factor C and the stiffness factor K both keep as constant and could be adjusted easily as need through the adjustment of $K_1$, $K_2$, $K_3$ and $K_4$.

Especially, $$\frac{di}{dt}$$

is negligible for the low-frequency and ultralow-frequency vibration and it can be assumed that $$\frac{di}{dt}$$

in (1) is equal to zero, then the electromechanical coupling equation of traditional electromagnetic exciter changed to be $$\begin{cases} m\ddot{x} + c\dot{x} + kx = Bli \\ Ri + Bl\dot{x} = u_0 \end{cases} \quad (9)$$

Accordingly, the transfer function of traditional exciter system is $$G(s) = \frac{X(s)}{U(s)} \quad (10)$$

$$= K_p \cdot \frac{Bl}{mRs^2 + [Rc + (Bl)^2]s + Rk}$$

$$= \frac{K_p Bl}{R} \cdot \frac{1}{ms^2 + \left(c + \frac{(Bl)^2}{R}\right)s + k}$$

Such system can be seen as a typical single-degree-of-freedom model. The equivalent damping and stiffness are $$C = c + \frac{(Bl)^2}{R}$$

and K=k respectively. K and C cannot be adjusted easily after the installation completion and contain nonlinear factors k and c, which result in the nonlinearity of K and C.

The electromechanical equation of traditional electromagnetic exciter removing the mechanical suspension device changes to be $$\begin{cases} m\ddot{x} + c_2\dot{x} = Bli \\ Ri + Bl\dot{x} = u_0 \end{cases} \quad (10)$$

Then the transfer function of the exciter system applying the electro-viscoelastic suspension device changes to be $$G(s) = \frac{X(s)}{U(s)} \quad (12)$$

$$= K_3 K_p \cdot \frac{Bl}{mRs^2 + [Rc_2 + K_2K_3K_4K_PBl + (Bl)^2]s + K_1K_3K_4K_PBl}$$

$$= \frac{K_3 K_P \cdot Bl}{R} \cdot \frac{1}{ms^2 + \left[c_2 + \frac{K_2K_3K_4K_PBl + (Bl)^2}{R}\right]s + \frac{K_1K_3K_4K_PBl}{R}}$$

Such system can also be seen as a typical single-degree-of-freedom model. The equivalent damping and stiffness are $$C = c_2 + \frac{(Bl)^2 + K_2K_3K_4K_PBl}{R} \quad \text{and}$$

$$K = \frac{K_1K_3K_4K_PBl}{R}$$

respectively. $c_2$ is mainly caused by air damping;

$$\frac{K_2 K_3 K_4 K_p Bl}{R} \gg c_2$$

can be true if $K_2$, $K_3$, $K_4$ are adjusted properly and $$C \approx \frac{(Bl)^2 + K_2 K_3 K_4 K_p Bl}{R}.$$

Assuming B is a constant independent with the displacement of the moving component x, then the equivalent damping factor C and the stiffness factor K in function (12) both keep as constant and the system has excellent linear characteristics and the performance of the system can be improved. Comparing functions (10) and (12), it can be clearly seen that, through the adjustment of the gain of the adjustable amplifier, the adjustable phase shifter and the proportioner, the equivalent damping factor C and the stiffness factor K can be directly adjusted.

To solve the phase shift between the input voltage and output displacement signal of the exciter appearing at high working frequency, the adjustable phase shifter can be adjusted to ensure that the phase of the feedback signal and the standard signal remains consistent The specific embodiments discussed are merely illustrative of specific ways to make and use the invention, and do not limit the scope of the invention. Meanwhile, it should be appreciated that various modifications and their equivalents can be devised by those skilled in the art and will fall within the spirit and scope of the principles of the disclosure.

The invention claimed is:

1. An electromagnetic vibration exciter system with an adjustable electro-viscoelastic suspension device comprises an electromagnetic exciter and a power amplifier; characterized in that:

the adjustable electro-viscoelastic suspension device is used in the vibration exciter system to support and restore its moving component and comprises a displacement sensor detecting displacement of the moving component of the electromagnetic exciter, a first adjustable amplifier, a second adjustable amplifier, a differentiator, an adder and an adjustable phase shifter, a subtracter, and a proportioner;

a displacement detected by the sensor and a displacement signal output by the sensor is processed by the first adjustable amplifier and a first amplified signal is produced, the displacement signal is simultaneously processed by the differentiator and the second adjustable amplifier successively and a second amplified signal is produced;

the first amplified signal and the second amplified signal are added by the adder, an output of which is processed by the adjustable phase shifter; a phase-shifted signal is imported into the subtracter as subtrahend; another input terminal of the subtracter is connected with a signal generator, a standard output of which is a minuend; a subtracter output is imported into the proportioner, the output of which is amplified by the power amplifier and then is imported into the exciter as driving signals;

transfer function of the exciter system is as follow:

$$G(s) = \frac{X(s)}{U(s)}$$

$$= K_3 K_p \cdot \frac{Bl}{mLs^3 + (mR + c_2 L)s^2 + [Rc_2 + (Bl)^2 + K_2 K_3 K_4 K_p Bl]s + K_1 K_3 K_4 K_p Bl}$$

$$= \frac{K_3 K_p Bl}{R} \cdot \frac{1}{\frac{mL}{R}s^3 + \left(m + \frac{c_2 L}{R}\right)s^2 + \left[c_2 + \frac{(Bl)^2 + K_2 K_3 K_4 K_p Bl}{R}\right]s + \frac{K_1 K_3 K_4 K_p Bl}{R}}$$

where m is total mass of the moving component (including a vibration table and a load under excitation; $c_2$ is damping caused by other factors than the suspension device; B is a magnetic flux density in an air gap; l is length of a coil within a magnetic field; L and R is inductance and resistance of the coil respectively; $K_1$, $K_2$, $K_3$, $K_4$ and $K_P$ is gain of the first adjustable amplifier, the second adjustable amplifier, the proportioner, the adjustable phase shifter and the power amplifier, respectively; s=jω is a Laplace operator; ω is a circular frequency of vibration;

$$C = c_2 + \frac{(Bl)^2 + K_2 K_3 K_4 K_p Bl}{R}$$

reflects equivalent damping characteristic of the system;

$$K = \frac{K_1 K_3 K_4 K_p Bl}{R}$$

reflects its equivalent stiffness characteristic.

2. The electromagnetic vibration exciter system with an adjustable electro-viscoelastic suspension device according to claim 1, wherein the transfer function of the exciter system running at a low and ultralow frequency is as follow:

$$G(s) = \frac{X(s)}{U(s)}$$

$$= K_3 K_p \cdot \frac{Bl}{mRs^2 + [Rc_2 + K_2 K_3 K_4 K_p Bl + (Bl)^2]s + K_1 K_3 K_4 K_p Bl}$$

$$= \frac{K_3 K_p \cdot Bl}{R} \cdot \frac{1}{ms^2 + \left[c_2 + \frac{K_2 K_3 K_4 K_p Bl + (Bl)^2}{R}\right]s + \frac{K_1 K_3 K_4 K_p Bl}{R}}$$

where $$C = c_2 + \frac{(Bl)^2 + K_2 K_3 K_4 K_p Bl}{R}$$

reflects the equivalent damping characteristic of the system;

$$K = \frac{K_1 K_3 K_4 K_p Bl}{R}$$

reflects its equivalent stiffness characteristic.

* * * * *